United States Patent [19]

Gervais

[11] Patent Number: 4,535,370
[45] Date of Patent: Aug. 13, 1985

[54] MAGNETIC TAPE REEL WRITE PROTECT MECHANISM

[75] Inventor: William J. Gervais, Northridge, Calif.

[73] Assignee: Rosstream Research Assoc. Ltd., Cerritos, Calif.

[21] Appl. No.: 452,335

[22] Filed: Dec. 22, 1982

[51] Int. Cl.³ .............................................. G11B 15/04
[52] U.S. Cl. ...................................... 360/60; 360/132
[58] Field of Search .......................... 360/60, 132, 134

[56] References Cited

U.S. PATENT DOCUMENTS

| | | | |
|---|---|---|---|
| 2,594,848 | 4/1952 | Begun | 360/60 |
| 2,761,017 | 8/1956 | Camras | 360/60 |
| 3,417,387 | 12/1968 | Rayfield | 360/60 |
| 3,564,155 | 2/1971 | Pendleton | 360/60 |
| 4,063,292 | 12/1977 | Karsh | 360/60 |

Primary Examiner—Raymond F. Cardillo, Jr.
Assistant Examiner—Alyssa H. Bowler
Attorney, Agent, or Firm—Fulwider, Patton Rieber, Lee & Utecht

[57] ABSTRACT

A mechanism to protect a reel of tape against the risk of inadvertent over-writing or erasure, including an actuator installed in the reel hub and rotatable between two angular positions from the front face of the reel, even when mounted on a tape drive. The axis of rotation of the actuator is offset from that of the reel, and the actuator has a peripheral portion that presents a sloping surface toward the rear of the reel, to engage an axially movable rod disposed along the reel axis. Rotation of the actuator from one angular position to another causes axial movement of the rod, which is conventionally detected and employed to control the write protection status of the tape reel.

9 Claims, 5 Drawing Figures

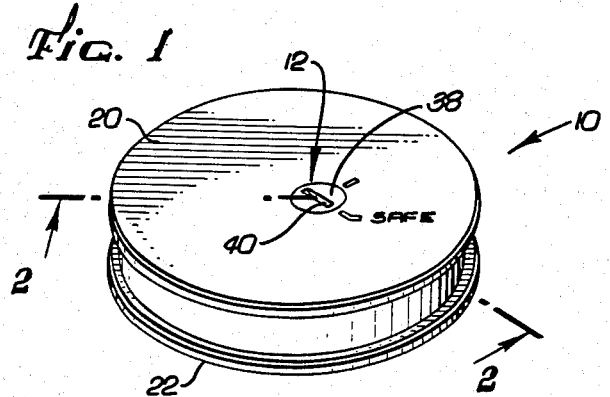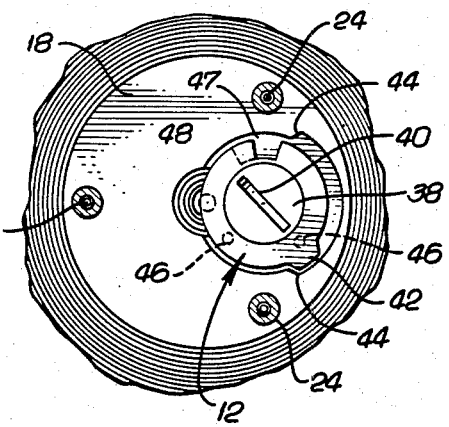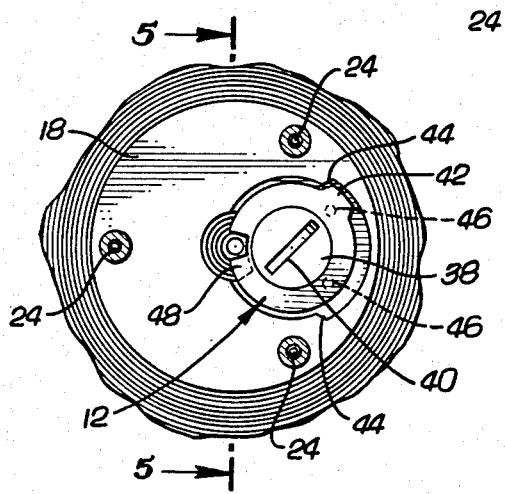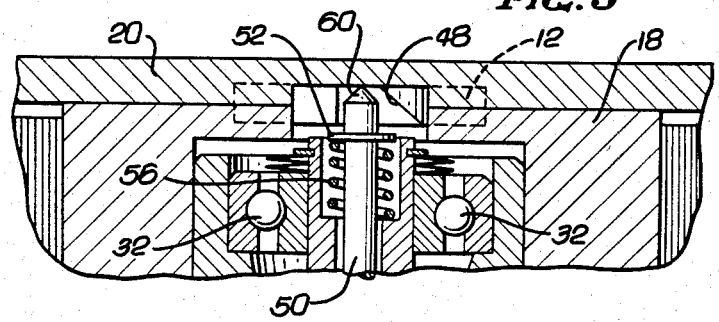

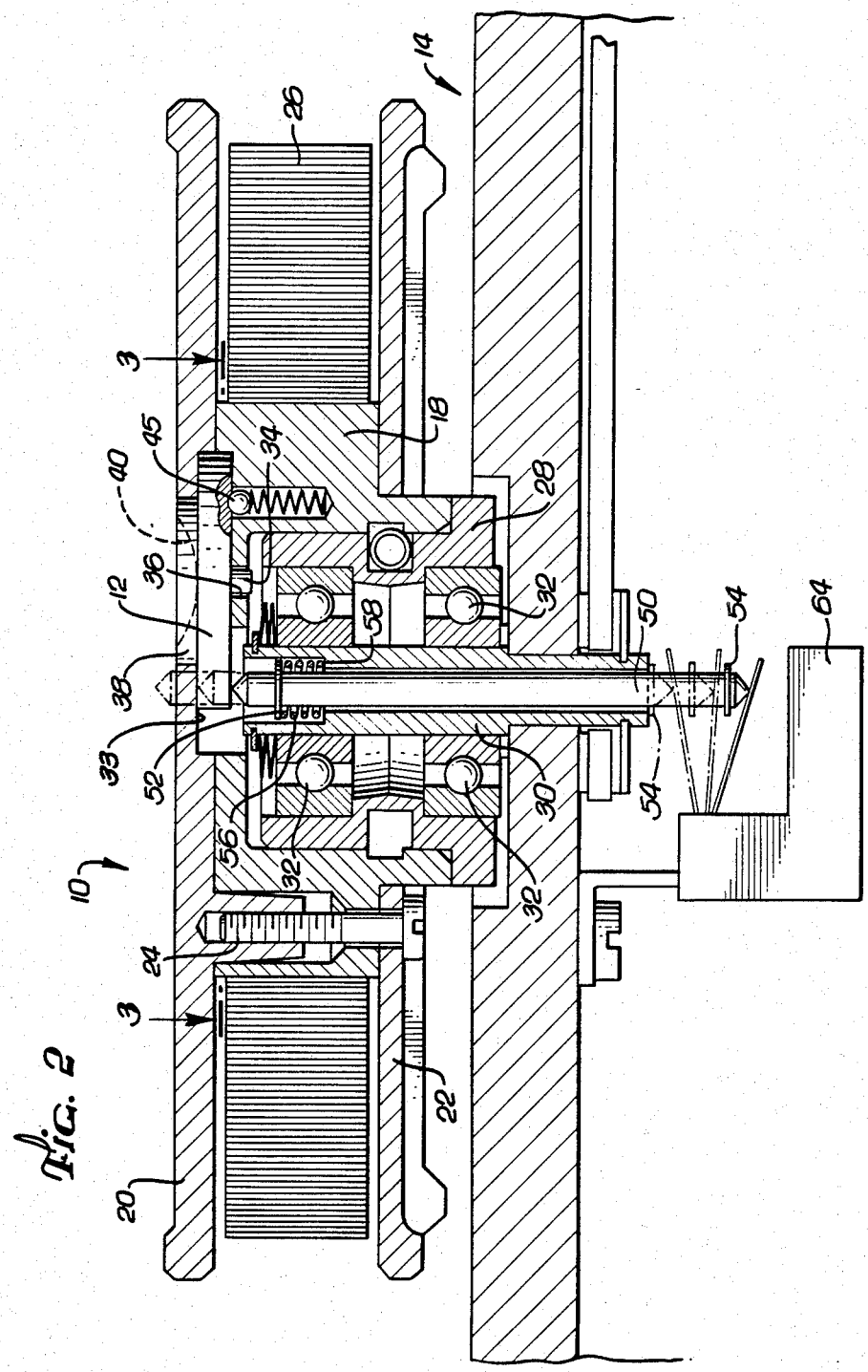

MAGNETIC TAPE REEL WRITE PROTECT MECHANISM

BACKGROUND OF THE INVENTION

This invention relates generally to magnetic tape drives for recording and retrieving data, and, more particularly, to mechanisms for preventing inadvertent writing on or erasing a tape. Magnetic tapes are used in conjunction with digital computers for the storage and retrieval of digital data. Since the data on a tape may be valuable or may be expensive to reproduce, it is customary to provide each tape reel with a "write-protect" feature, whereby data on the tape cannot be erased, or overwritten with new data, without some deliberate act of the person loading the tape reel onto a tape drive.

In the past, this protection feature has been implemented by means of a plastic "write ring," which may be fitted in an annular groove in the hub of the tape reel. The presence or absence of the ring is sensed by a probe that is automatically extended from the tape drive when a tape has been loaded. The probe then immediately retracts, to avoid frictional wear that would otherwise take place if the probe were left in contact with the ring.

This approach to tape protection has at least three significant disadvantages. First, the ring has to be mounted on the rear face of the reel, and is not visible once the reel has been mounted on the tape drive. Hence, a last-minute check of the tape's protection status is not possible, and the risk of inadvertent tape erasure is still significant. Moreover, the ring is not visible when the tape reel is on a table or other surface with its labelled front face up. Another drawback is that the "wire ring" is a separate component that has to be separately stored and is subject to being misplaced or lost. Finally, the requirement for a retractable probe adds to the cost and mechanical complexity of the tape drive mechanism, and increases its power consumption.

It will be apparent from the foregoing that there has been a significant need in the field of magnetic tape drives for a technique that will permit the write-protect status of a tape reel to be determined from the front or label side of the reel, and will also permit the status to be quickly changed from the front side of the reel, without the use of separable parts and without using a retractable probe. The present invention is directed to these ends.

SUMMARY OF THE INVENTION

The present invention resides in a tape reel having means operable from the front face of the reel, for switching the status of the reel between protected and unprotected, and sensing means incorporated in a tape drive mechanism, for sensing the status of the reel from its rear face. Briefly, and in general terms, the mechanism of the invention includes a tape reel having a front flange and a rear flange, switching means incorporated into the front flange and operable from the front face thereof, for switching the status of the reel between protected and unprotected conditions, and sensing means located on the axis of rotation of the reel, for sensing the status of the switching means.

More specifically, the switching means includes an actuator rotatable from the front face of the front flange, about an axis eccentric to the axis of rotation of the reel, the actuator being movable between first and second angular positions. The sensing means includes a rod mounted for limited axial movement along the axis of rotation of the reel, and biasing means for urging the rod toward an extended position. The actuator presents a camming surface to the distal end of the rod, and is operative to move the rod axially between extended and retracted positions as the actuator is rotated between its two angular positions. Preferably the rod has a third position in which it is further extended if the reel is not present or is improperly mounted.

In the illustrative embodiment of the invention, the actuator further includes an integral boss protruding through an opening in the front flange, and having a slot to facilitate rotation of the actuator by means of a coin. To further facilitate use of the mechanism, it includes means on the front face of the tape reel for indicating the protection status of the reel.

The illustrative embodiment also includes detent means for retaining the actuator in its selected position. More specifically, the detent means includes a spring and a detent ball, the ball being urged by the spring into one of two recesses in a surface of the actuator.

It will be appreciated from the foregoing that the invention represents a significant improvement in mechanisms to help prevent inadvertent erasure of magnetic tapes. In particular, the invention provides a convenient device for changing the protection status of a tape reel from its front face, even when the reel is mounted in a tape drive mechanism. The invention also provides an easily observable indication of the protection status of the tape, and requires a relatively simple sensing device within the tape drive mechanism. Other aspects and advantages of the invention will become apparent from the following more detailed description, taken in conjunction with the accompanying drawings.

BRIEF DESCRIPTION OF THE DRAWINGS

FIG. 1 is a perspective view of a magnetic tape reel embodying the write protection mechanism of the invention;

FIG. 2 is an enlarged sectional view of the reel shown in FIG. 1, taken substantially along the line 2—2 of FIG. 1;

FIG. 3 is a sectional plan view of the reel hub, taken substantially along the line 3—3 of FIG. 2 and showing the write protection mechanism in a safe or protected position;

FIG. 4 is a sectional plan view similar to FIG. 3, but showing the write protection mechanism in an unprotected position; and FIG. 5 is an enlarged fragmentary sectional view taken substantially along the line 5—5 of FIG. 4, and showing structural detail of portions of the mechanism in the unprotected position.

DESCRIPTION OF THE PREFERRED EMBODIMENT

As shown in the drawings for purposes of illustration, the present invention is principally concerned with a mechanism for the protection of magnetic tapes from inadvertent erasure or over-writing with other data. The use of a removable "write ring" for this purpose has a number of drawbacks, not the least of which is the limitation that it must be installed on the rear face of the tape reel. Once the reel is mounted on a tape drive mechanism, the protection status of the reel can neither be observed nor changed without first removing the reel.

In accordance with the invention, a tape reel may be switched between its protected and unprotected conditions from the front face of the reel, even when it is mounted on a tape drive mechanism, and the protection status is readily observable from the front face of the reel at all times. The invention also permits the drive mechanism to sense the absence of a tape reel from the drive mechanism, or the presence of an improperly mounted reel.

More specifically, and as shown in the drawings, the invention is embodied in a write protection mechanism structured as a non-removable feature of a tape reel, indicated generally by reference numeral 10. As will be described in detail, the reel 10 includes an actuator 12 that is manually movable between protected and unprotected positions, and the mechanism also includes means incorporated into a tape drive mechanism 14, for sensing the position of the actuator.

As best shown in FIG. 2, the reel 10 has a central hub 18 secured between a front flange 20 and a rear flange 22. In this context, the terms "front" and "rear" are used only to distinguish the two faces of the hub, and refer to its orientation when mounted on the tape drive 14. The flange placed adjacent to the tape drive 14 is the rear flange 22, while the flange facing out from the tape drive is the front flange 20. The flanges 20 and 22 are secured to the hub 18 by conventional means, such as by threaded bolts or screws, shown at 24. Magnetic tape, indicated at 26 in FIG. 2, is wound onto the hub 18 between the flanges 20 and 22. In the tape drive 14, which forms no part of this invention, the tape 26 is driven past a read/write transducer (not shown) and then onto a take-up reel (not shown), but is rewound onto the original reel 10 before removal from the tape drive.

The hub 18 is removably mounted on a central spindle 28, which is generally cylindrical in shape, to fit into the hub from the rear. The spindle 28 is rotatably mounted on a spindle shaft 30 by means of conventional bearings 32.

The actuator 12 is basically a flat, disc-shaped element located in an appropriately sized recess 33 behind the front flange 20. On the rear face of the actuator 12 is an integral central pin 34, sized to fit a corresponding hole 36 in the hub 18, to provide an axis of rotation that is displaced from the axis of the spindle shaft 30. The actuator 12 also has an integral circular boss 38 centrally located on its front face. The boss 38 fits a corresponding opening in the front flange 20 of the reel 10, and forms a practically flush surface with the front face of the flange. The boss 38 has a diametric slot 40 into which the edge of a coin may be conveniently fitted, to facilitate rotation of the actuator 12.

To limit the angular rotation of the actuator 12, it is provided with an integral lug 42. When the actuator 12 is rotated to its fullest extent, in either direction, the lug 42 abuts one or the other of two shoulders 44 in the recess in which the actuator is fitted. The shoulders 44 are approximately ninety degrees apart and limit the angular movement of the actuator to somewhat less than ninety degrees. A spring-loaded detent ball 45 is biased against the rear face of the actuator 12. The ball 45 engages one of two recesses 46 when the actuator 12 is rotated either to its fully clockwise position or to its fully counter-clockwise position, thereby providing a desirable detent action to prevent inadvertent rotation of the actuator.

The actuator 12 is located and dimensioned such that its outer periphery extends over the axis of the spindle shaft 30. An outer peripheral portion of the actuator includes a discontinuity or slot 47, and on one side of the slot there is a sloping camming surface 48 where the actuator is tapered from its full thickness to a zero thickness at the slot. When the actuator 12 is rotated clockwise until it reaches the position shown in FIG. 3, it presents its full thickness at the spindle axis. When rotated counter-clockwise to the position shown in FIG. 4, the slot 47 is positioned at the spindle axis.

The angular position of the actuator 12 is sensed by means of a central rod 50 mounted within the spindle shaft 30. The rod has a retaining ring 52 affixed near its distal end and another retaining ring 54 near its proximal end. A compression spring 56 is disposed between the first retaining ring 52 and an annular shoulder 58 in the shaft 30. The spring 56 urges the rod 50 out from the shaft 30. Unless otherwise constrained, the spring urges the rod 50 out until the second retaining ring 54 abuts an end of the spindle shaft 30.

As best shown in FIG. 5, if the actuator is in its counter-clockwise position, the rod 50, which has its distal end tapered, extends into the slot 47 of the actuator 12, until the tapered end contacts the rear side of the front reel flange. When the actuator 12 is rotated to its clockwise position, the camming surface 48 engages the distal end of the rod 50 and forces it back against the pressure of the compression spring 56. It will be appreciated that the rod 50 has three distinct axial positions. It has a retracted position and an extended position corresponding to the two angular positions of the actuator 12. In addition, the rod 50 has a further extended position if the reel 10 is completely removed from the spindle 28, or if the reel is improperly mounted. These three positions can be sensed by means of a conventional electrical switch 64, as shown diagrammatically in FIG. 2. Once the status of the reel has been converted to an electrical signal in this manner, it is a simple matter to arrange for circuitry in the tape drive mechanism 14 to disable writing on the tape if the tape actuator 12 is in the "safe" condition.

As shown in FIG. 1, the front flange 20 of the reel 10 is preferably marked with a legend indicating the status of the reel, that is whether the actuator 12 is in the protected or unprotected position. As illustrated, the clockwise position of the actuator 12 is designatged the "safe" or protected position. If desired, however, the other position of the actuator 12 could be chosen as the protected position, with appropriate changes being made to the tape drive circuitry.

It will be appreciated from the foregoing that the present invention represents a significant advance in the field of magnetic tape recording techniques. In particular, the invention allows an operator to switch a tape between write-protected and unprotected conditions from the front face of the tape reel, even when the reel is mounted on a tape drive mechanism. In addition, the protection status of the tape reel is always visible from the front face of the reel, and no removable parts are needed to protect a tape from inadvertent erasure.

It will also be appreciated that, although a specific embodiment of the invention has been described in detail by way of illustration, various modifications may be made without departing from the spirit and scope of the invention. Accordingly, the invention is not to be limited except as by the appended claims.

I claim:

1. A mechanism to reduce the risk of inadvertent erasure or over-writing of a magnetic tape, said mechanism comprising:

a tape reel having a front flange and a rear flange;

switching means incorporated into said front flange and operable from the front face thereof, for switching the status of said reel between protected and unprotected conditions, such switching means including an actuator rotatable from the front face of said front flange, about an axis eccentric to the axis of rotation of said reel, and rotatable between first and second angular positions; and sensing means located on the axis of rotation of said reel, for sensing the status of said switching means, said sensing means including a rod mounted for limited axial movement along the axis of rotation of said reel and biasing means for urging said rod toward an extended position, wherein said actuator presents a camming surface toward an end of said rod, and is operative to move said rod axially between extended and retracted positions as said actuator is rotated between its two angular positions.

2. A mechanism as set forth in claim 1, wherein:

said rod has a third position in which it is further extended if said reel is not present or is improperly mounted.

3. A mechanism as set forth in claim 1, wherein:

said actuator further includes an integral portion protruding through an opening in said front flange, and having a slot therein to facilitate rotation of said actuator by means of a coin; and said mechanism further includes means on the front face of said front flange for indicating the protection status of said reel.

4. A mechanism as set forth in claim 1, and further including:

detent means, to retain said actuator in a selected one of said first and second angular positions.

5. A mechanism to reduce the risk of inadvertent erasure or over-writing of a magnetic tape, said mechanism comprising:

a tape reel having a central hub, a front flange and a rear flange;

an actuator mounted in said hub for angular movement about an axis displaced from the axis of rotation of said reel, said actuator having a circumferential portion extending through the axis of rotation of said reel and having a sloping camming surface presented toward said rear flange, said actuator being angularly movable between a first angular position and a second angular position;

a rod substantially aligned with the axis of rotation of said reel and mounted for limited axial movement;

a spring for urging said rod toward an extended position with respect to said reel, wherein said rod is moved to a first axial position when said actuator is in its first angular position and to a second axial position when said actuator is in its second angular position; and position sensing means disposed such that the axial position of said rod may be determined by said position sensing means and the angular position of said actuator may be determined from the axial position of said rod.

6. A mechanism as set forth in claim 5, wherein said actuator further includes:

an integral lug to limit angular movement of said actuator between the first and second positions; and an integral boss fitted into a corresponding hole through said front flange, said boss having a diametric slot to permit its rotation from the front face of said reel.

7. A mechanism as set forth in claim 6, wherein:

said diametric slot in said boss is dimensioned to permit operation with a coin; and said diametric slot is used to provide a visual indication of the protection status of said reel.

8. A mechanism as set forth in claim 5, and further including:

a detent ball retained on the rear face of said actuator;

a detent spring for urging said ball into contact with said actuator; and a pair of recesses in said actuator, to receive said detent ball and thereby retain said actuator at a selected one of two angular positions.

9. A mechanism as set forth in claim 5, wherein:

said rod is further extendable to a third axial position in the absence of said reel, or if said reel is improperly mounted; and said position sensing means also provides an indication of missing or improperly mounted reels.

* * * * *